(12) United States Patent
Uto et al.

(10) Patent No.: US 9,238,396 B2
(45) Date of Patent: Jan. 19, 2016

(54) AIR-CONDITIONING APPARATUS FOR VEHICLE

(75) Inventors: Taichi Uto, Tokyo (JP); Nobuhiko Nakagawa, Tokyo (JP); Hidetaka Adachi, Tokyo (JP); Hisanobu Nakamura, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 306 days.

(21) Appl. No.: 13/824,602

(22) PCT Filed: Nov. 30, 2010

(86) PCT No.: PCT/JP2010/006963
§ 371 (c)(1),
(2), (4) Date: Mar. 18, 2013

(87) PCT Pub. No.: WO2012/073272
PCT Pub. Date: Jun. 7, 2012

(65) Prior Publication Data
US 2013/0180277 A1    Jul. 18, 2013

(51) Int. Cl.
*B60H 1/00* (2006.01)
*B61D 27/00* (2006.01)

(52) U.S. Cl.
CPC ............ *B60H 1/00* (2013.01); *B60H 1/00371* (2013.01); *B60H 1/00535* (2013.01); *B61D 27/00* (2013.01)

(58) Field of Classification Search
CPC ...... B60H 1/00; B60H 1/00371; B61D 27/00; B61D 17/00
USPC ......................................................... 62/239
See application file for complete search history.

(56) References Cited

U.S. PATENT DOCUMENTS 4,134,275 A * 1/1979 Erickson ............ B60H 1/00371
62/243

FOREIGN PATENT DOCUMENTS

| CN | 2784261 Y | 5/2006 |
|---|---|---|
| CN | 201626418 U | 11/2010 |
| JP | 59-110714 U | 7/1984 |
| JP | 59-223558 A | 12/1984 |
| JP | 61-211119 A | 9/1986 |

(Continued)

OTHER PUBLICATIONS

Office Action (Notice of Reasons for Rejection) issued on Nov. 12, 2013, by the Japanese Patent Office in corresponding Japanese Patent Application No. 2011-546566, and an English Translation of the Office Action. (6 pages).

(Continued)

*Primary Examiner* — Emmanuel Duke
(74) *Attorney, Agent, or Firm* — Buchanan Ingersoll & Rooney PC

(57) ABSTRACT

Provided is an air-conditioning apparatus for vehicle including a main frame capable of being assembled without increasing the number of parts and the number of processes. An air-conditioning apparatus for vehicle includes a casing divided into an indoor chamber and an outdoor chamber by a partition plate, the casing including a cover placed on a top thereof, and a refrigeration cycle device placed across the indoor chamber and the outdoor chamber in the casing. Each of side plates, serving as side surfaces of the indoor chamber and the outdoor chamber, of the casing is extruded in one piece of aluminum.

2 Claims, 4 Drawing Sheets

(56) References Cited

FOREIGN PATENT DOCUMENTS

| | | | | |
|---|---|---|---|---|
| JP | 62-38766 | U | 3/1987 | |
| JP | 63-4813 | U | 1/1988 | |
| JP | 63-138216 | U | 9/1988 | |
| JP | 2001180256 A | * | 7/2001 | ............... B60H 1/22 |
| JP | 2003-081085 A | | 3/2003 | |
| JP | 3632538 B2 | | 3/2005 | |
| JP | 2006-273099 A | | 10/2006 | |
| JP | 2006297964 A | * | 11/2006 | ............. B61D 27/00 |
| JP | 2008-296724 A | | 12/2008 | |
| JP | 2010-188951 A | | 9/2010 | |

OTHER PUBLICATIONS

International Search Report (PCT/ISA/210) issued on Feb. 22, 2011, by the Japanese Patent Office as the International Searching Authority for International Application No. PCT/JP2010/006963.

Office Action issued on Dec. 16, 2014, by the Chinese Patent Office in corresponding Chinese Application No. 201080070419.4, and an English Translation of the Office Action. (9 pages).

* cited by examiner

A-A    B-B ued States Patent US 9,238,396 B2

AIR-CONDITIONING APPARATUS FOR VEHICLE

TECHNICAL FIELD

The present invention relates to an air-conditioning apparatus for vehicle which is installed in a railroad vehicle.

BACKGROUND ART

In general, side plates of a main frame, serving as a portion of a casing of an air-conditioning apparatus for vehicle, include many parts, such as a bent member and a reinforcement, joined by welding. Each side plate includes two segments for an indoor chamber and an outdoor chamber and the segments are joined to each other after assembly of the chambers. Additionally, the side plate is provided with many parts, for example, an attachment member used to attach the air-conditioning apparatus for vehicle to a railroad vehicle, a hanging fitting used to hang the air-conditioning apparatus for vehicle, a cover attachment fitting used to attach a cover to the main frame, and a reinforcing member for enhancing the strength of the side plate in order to prevent deformation after attachment to the railroad vehicle or upon hanging, the parts being attached to the side plate by welding (refer to Patent Literature 1, for example).

CITATION LIST

Patent Literature

Patent Literature 1: Japanese Unexamined Patent Application Publication No. 59-223558 (pp. 2-3, FIGS. 3 and 8)

SUMMARY OF INVENTION

Technical Problem

The above-described related-art manner of assembling each side plate requires many parts and many processes. In terms of cost reduction and workability improvement, the number of parts has to be reduced while the strength necessary to constitute a main frame of an air-conditioning apparatus for vehicle is being maintained.

Furthermore, although an attachment member, a hanging fitting, and the like are attached to the side plate, it takes much time to position the attachment member and the hanging fitting upon attachment to the side plate. Additionally, since the position of each attachment member varies depending on railroad vehicle in which the air-conditioning apparatus for vehicle is installed, it is difficult to achieve commonality of side plates constituting a main frame.

The present invention has been made to overcome the above-described problems. A first object of the present invention is to provide an air-conditioning apparatus for vehicle with a main frame capable of being assembled without increasing the number of parts or the number of processes.

A second object of the present invention is to provide an air-conditioning apparatus for vehicle in which an attachment member and a hanging fitting can be easily attached to each side plate of a main frame of the air-conditioning apparatus for vehicle.

Solution to Problem

The present invention provides an air-conditioning apparatus for vehicle which includes a casing divided into an indoor chamber and an outdoor chamber by a partition plate, the casing including a cover placed on a top thereof, and a refrigeration cycle device placed across the indoor chamber and the outdoor chamber in the casing. A side plate constituting the casing is extruded in one piece of metal.

Advantageous Effects of Invention

According to the present invention, since the side plate constituting the casing is extruded in one piece of metal, the number of parts and the number of processes can be reduced as compared with the above-described related art. Furthermore, since the side plate is a single part, the workability and quality of the side plate can be improved as compared with a side plate assembled from parts joined together, so that the cost can be reduced.

DESCRIPTION OF EMBODIMENTS

Embodiment 1

Figure 1:
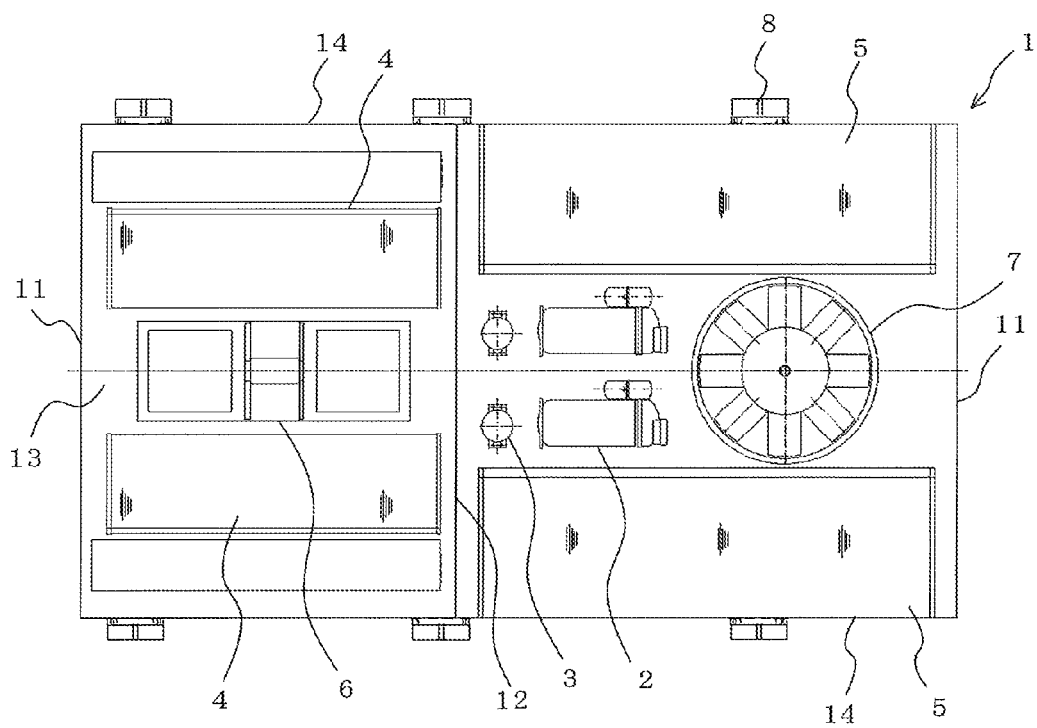
FIG. 1 is a top view of an air-conditioning apparatus for vehicle according to Embodiment 1.
Figure 2:
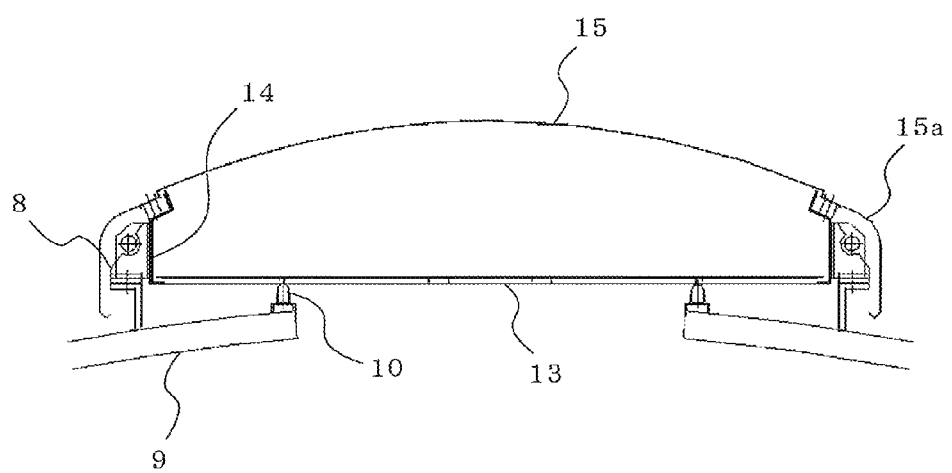
FIG. 2 is a cross-sectional view illustrating the air-conditioning apparatus for vehicle according to Embodiment 1 when viewed in a longitudinal direction thereof.

FIG. 1 is a top view of an air-conditioning apparatus for vehicle according to Embodiment 1. FIG. 2 is a cross-sectional view illustrating the air-conditioning apparatus for vehicle according to Embodiment 1 when viewed in a longitudinal direction thereof.

In FIGS. 1 and 2, the air-conditioning apparatus for vehicle according to Embodiment 1 includes a main frame 1 and a cover 15, which constitute a casing, and further includes a refrigeration cycle device placed within the main frame 1, and is of a roof mounted type which is mounted on a roof 9 of a railroad vehicle. A gasket 10 (refer to FIG. 2) for sealing to protect a compartment of the railroad vehicle against water from outdoors is attached to the roof 9 of the railroad vehicle on which this type of air-conditioning apparatus for vehicle is mounted. The gasket 10 is pressed by a bottom plate 13, which will be described later, when the air-conditioning apparatus for vehicle is mounted on the roof 9 of the railroad vehicle.

The above-described refrigeration cycle device includes a compressor 2, a refrigerant gas-liquid separator 3, an indoor heat exchanger 4, an outdoor heat exchanger 5, an indoor fan 6, and an outdoor fan 7. The indoor heat exchanger 4 and the indoor fan 6 of these components are arranged in an indoor chamber. The compressor 2, the refrigerant gas-liquid separator 3, the outdoor heat exchanger 5, and the outdoor fan 7 are arranged in an outdoor chamber.

The above-described main frame 1 includes the bottom plate 13 which has a rectangular outside shape, end plates 11 which upwardly extend from both ends in a longitudinal direction of the bottom plate 13, side plates 14 arranged at both ends in a width direction of the bottom plate 13, and a partition plate 12 for separating the indoor chamber from the outdoor chamber. The cover 15, which is used to cover an upper opening of the main frame 1, is provided with side surface covers 15a attached to both ends thereof. The cover 15 and the side surface covers 15a comprise a material, such as FRP, stainless steel, or aluminum.

The side plates 14 are arranged as both side surfaces of the indoor chamber and the outdoor chamber separated by the partition plate 12. Each side plate 14 is extruded in one piece of aluminum. For example, as illustrated in FIG. 2, the extruded one-piece side plate 14 includes a laterally extending part joined to the bottom plate 13, a side wall part bent upwardly from the laterally extending part, an inclined part bent so as to extend obliquely upwardly from the side wall part at a certain level to a side on which the laterally extending part extends, and an engagement part for the cover 15, the engagement part being bent upwardly at a right angle from the distal end of the inclined part.

An attachment member 8 for attachment to the roof 9 of the railroad vehicle, a cover attachment fitting for attachment of the cover 15, and a hanging fitting for hanging the apparatus are attached to an outer surface of each side plate 14 by welding, the fittings being not illustrated. In the case where such parts comprise a material different from that of the side plate 14, such as stainless steel, the parts are attached to the side plate 14 with rivets or the like.

As described above, since each of the side plates 14 arranged as the side surfaces of the indoor chamber and the outdoor chamber is an extruded one-piece aluminum part, the number of parts and the number of processes are reduced as compared with those in the above-described related art. Furthermore, since each side plate 14 is a single part, the workability and quality of the side plate 14 are improved as compared with a side plate assembled from parts joined together, so that the cost can be reduced.

Embodiment 2

Figure 3:
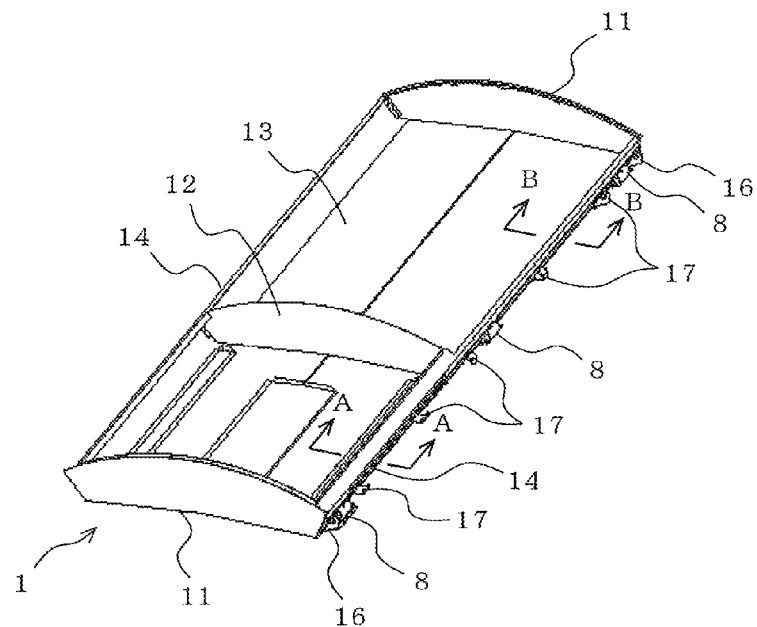
FIG. 3 is a perspective view illustrating a main frame of an air-conditioning apparatus for vehicle according to Embodiment 2.
Figure 4:
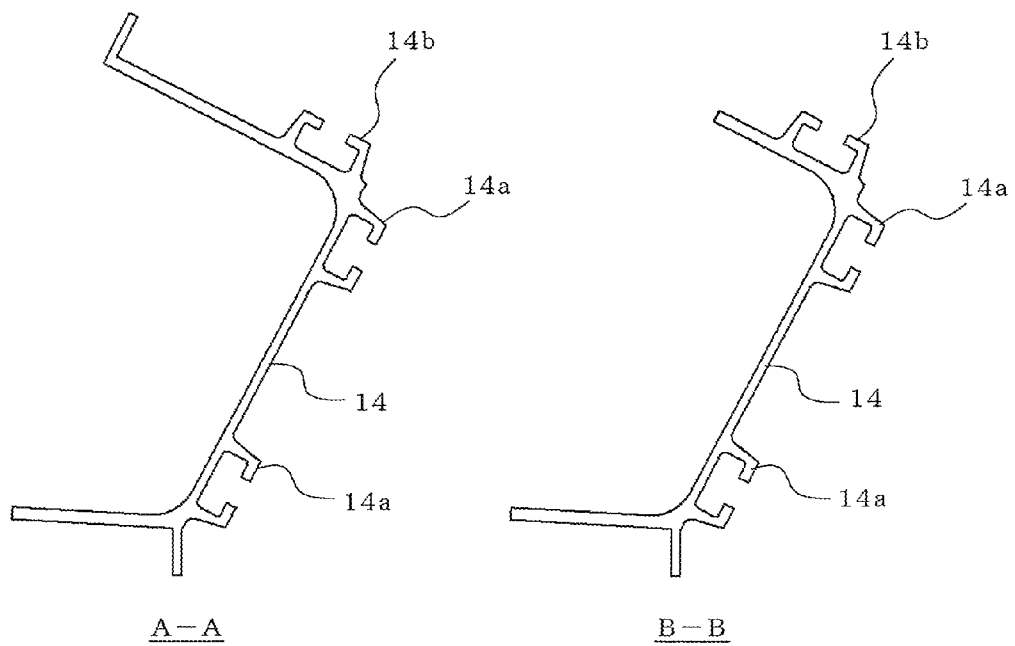
FIG. 4 illustrates an enlarged cross-section of a side plate of the main frame taken along the line A-A and that taken along the line B-B in FIG. 3.
Figure 5:
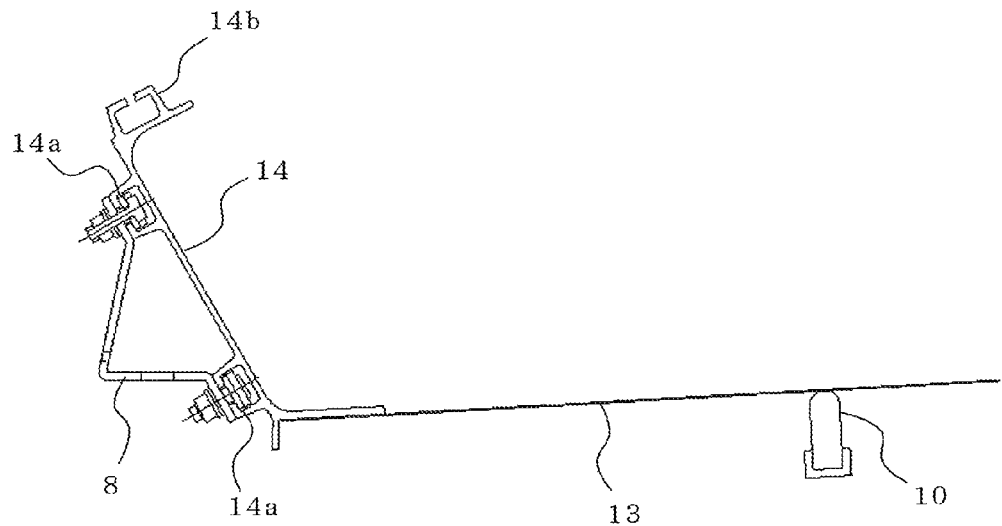
FIG. 5 is a sectional view illustrating the side plate of FIG. 4 with an attachment member.
Figure 6:
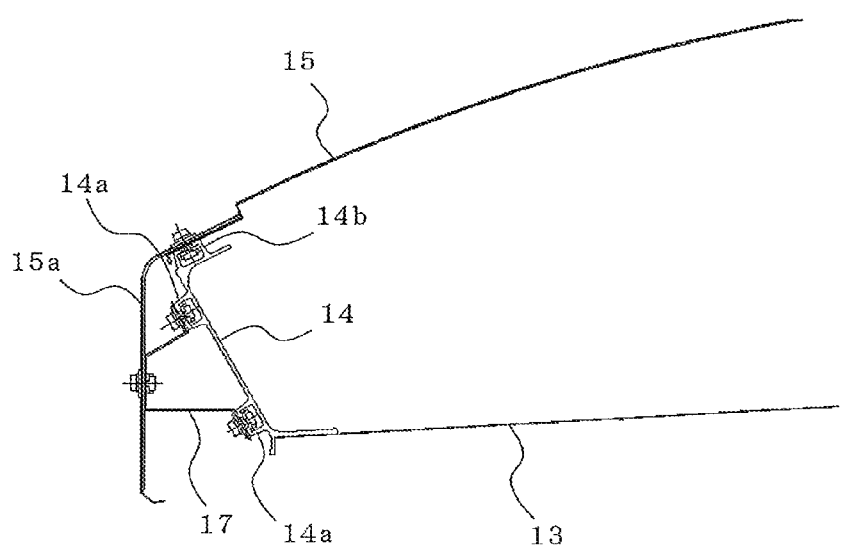
FIG. 6 is a sectional view illustrating the side plate of FIG. 4 with a cover attachment fitting.

FIG. 3 is a perspective view illustrating a main frame of an air-conditioning apparatus for vehicle according to Embodiment 2. FIG. 4 illustrates enlarged cross-sections of a side plate of the main frame illustrated in FIG. 3. FIG. 5 is a sectional view illustrating the side plate of FIG. 4 with an attachment member. FIG. 6 is a sectional view illustrating the side plate of FIG. 4 with a cover attachment fitting. In Embodiment 2, the same components as or components equivalent to those in Embodiment 1 are designated by the same reference numerals.

The air-conditioning apparatus for vehicle according to Embodiment 2 is of the roof mounted type which is mounted on a roof 9 of a railroad vehicle, like the apparatus according to Embodiment 1. The air-conditioning apparatus includes a main frame 1 including side plates 14, which are arranged as both side surfaces of an indoor chamber and an outdoor chamber in the same way as the above description, each side plate 14 being extruded in one piece of aluminum.

For the side plates 14, for example, as illustrated in A-A of FIG. 4, an indoor chamber portion of each side plate 14 includes a laterally extending part to be joined to a bottom plate 13, a side wall part bent obliquely upwardly from the laterally extending part so as to extend outwardly, an inclined part bent at a substantially right angle from the side wall part at a certain level so as to extend obliquely to a side on which the laterally extending part extends, an engagement part for a cover 15, the engagement part being bent upwardly at a right angle from the distal end of the inclined part, two supports 14a arranged so as to protrude from an outer surface of the side wall part of the side plate 14, each support 14a having a curtain rail structure and substantially the same length as a longitudinal length of the side plate 14, and one support 14b disposed so as to protrude from an upper surface of the inclined part of the side plate 14, the support 14b having a curtain rail structure and the same length as that of the supports 14a. The above-described two supports 14a are molded such that the supports 14a and the side wall part have a substantially C-shaped cross-section. The one support 14b is also molded such that the support 14b and the inclined part have a substantially C-shaped cross-section in the same way as the above description. A gasket 10 for sealing to protect a compartment of the railroad vehicle against water from outdoors is attached to an edge of the above-described engagement part.

For example, as illustrated in B-B of FIG. 4, an outdoor chamber portion of each side plate 14 of the side plates 14 includes a laterally extending part to be joined to the bottom plate 13, a side wall part bent obliquely upwardly from the laterally extending part so as to extend outwardly, an inclined part bent at a substantially right angle from the side wall part at the same level as the above-described level so as to extend obliquely to the side on which the laterally extending part extends, supports 14a arranged so as to protrude from an outer surface of the side wall part of the side plate 14 in the same way as the above description, each support 14a having a curtain rail structure and being molded so as to have a substantially C-shaped cross-section, and a support 14b disposed so as to protrude from an upper surface of the inclined part of the side plate 14, the support 14b having a curtain rail structure and being molded so as to have a substantially C-shaped cross-section.

Each side plate 14 including the indoor chamber portion and the outdoor chamber portion is an extruded one-piece aluminum part as described above. As regards the outdoor chamber portion of the side plate 14, after the side plate 14 is molded in one piece including the outdoor chamber portion and the indoor chamber portion, the distal end of the inclined part of the outdoor chamber portion is cut by machining or stamping in accordance with a request for the outdoor chamber portion of the side plate 14.

For example, as illustrated in FIG. 3, the above-described two supports 14a are used to fasten three attachment members 8 arranged for each side plate 14, two hanging fittings 16 arranged for both ends of each side plate 14, and five cover attachment fittings 17 arranged for each side plate 14 such that the supports and fittings are movable in a horizontal direction. The support 14b is used to fasten a side surface cover 15a.

For example, to attach each attachment member 8 to the side plate 14, the attachment member 8 is fastened to the two upper and lower supports 14a with bolts and nuts as illustrated in FIG. 5. In this case, since the bolts can be moved in grooves in the supports 14a, the attached attachment member 8 can be easily positioned relative to the main frame 1 of the air-conditioning apparatus for vehicle.

Furthermore, the attachment member 8 is adjusted in a width direction (width direction of the main frame 1) and/or a height direction with a spacer. To adjust the attachment member 8 in the width direction, a spacer having a through-hole for the bolt is disposed between the attachment member 8 and each of the two supports 14a. For the attachment member 8 illustrated in FIG. 5, to adjust the attachment member 8 in the height direction, a spacer is disposed between a laterally extending part of the attachment member 8 and an attachment member support (not illustrated) placed on the roof of the railroad vehicle and is fastened with a bolt. The height of the air-conditioning apparatus for vehicle can be adjusted by changing the degree of inclination of the side plates 14.

To attach each cover attachment fitting 17 to the side plate 14, the cover attachment fitting 17 is fastened to the supports 14a with bolts and nuts as illustrated in FIG. 6. In this case, since the bolts can be moved in the grooves in the supports 14a, the cover attachment fitting 17 can be easily positioned relative to an attachment hole of the side surface cover 15a. The side surface cover 15a is fastened to the cover attachment fitting 17 and is then fastened to the support 14b on the engagement part of the side plate 14.

As described above, since each of the side plates 14 arranged as the side surfaces of the indoor chamber and the outdoor chamber is an extruded one-piece aluminum part, the number of parts and the number of processes can be reduced in the same way as Embodiment 1.

Each side plate 14 includes the supports 14a and 14b each having the curtain rail structure and the supports 14a and 14b each function as a reinforcing member. Accordingly, the number of reinforcing members can be reduced.

Furthermore, the attachment members 8, the cover attachment fittings 17, and the hanging fittings 16 can be fastened to the supports 14a and 14b of the side plates 14 with the bolts. This facilitates attachment positioning and attachment operations. Since the bolts are used for fastening, the number of welds can be reduced.

Since the positions of the attachment members 8 vary depending on railroad vehicle on which the air-conditioning apparatus for vehicle is mounted, it has been difficult to achieve commonality of side plates. The use of the supports 14a and 14b of the side plates 14 allows the attachment members 8 to be flexibly positioned in the longitudinal direction of the side plates 14. Accordingly, the commonality of the side plates 14 can be achieved.

Embodiment 3

Figure 7:
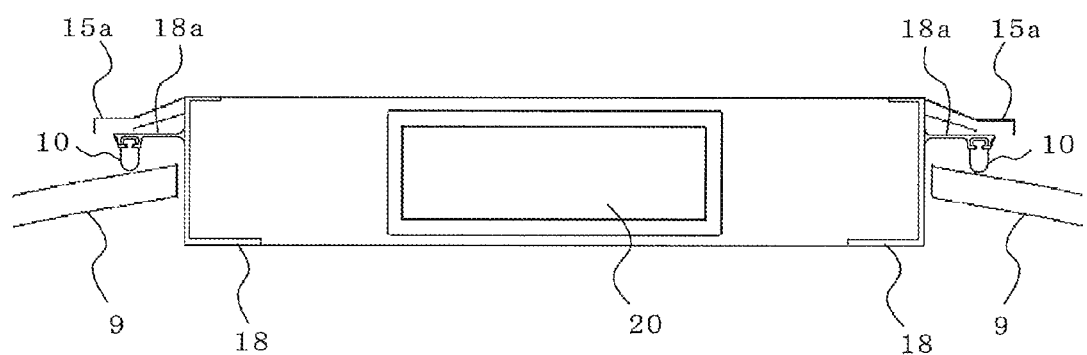
FIG. 7 is a front view of an air-conditioning apparatus for vehicle according to Embodiment 3.
Figure 8:
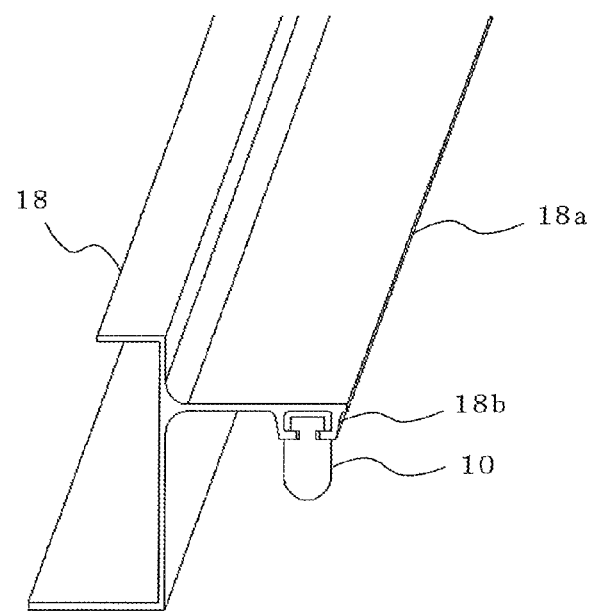
FIG. 8 is an enlarged perspective view of a side plate illustrated in FIG. 7.

FIG. 7 is a front view of an air-conditioning apparatus for vehicle according to Embodiment 3. FIG. 8 is an enlarged perspective view of a side plate illustrated in FIG. 7. In Embodiment 3, the same components as or components equivalent to those in Embodiment 1 are designated by the same reference numerals.

The air-conditioning apparatus for vehicle according to Embodiment 3 is of a fitted type which is placed so as to extend through a roof 9 of a railroad vehicle. This air-conditioning apparatus includes a casing including a main frame and a cover, the casing being rectangular such that the casing extends along the width of the railroad vehicle when viewed from the front. The casing has an air outlet 20 at a front surface thereof, the air outlet 20 being coupled to an air-conditioning duct placed in the railroad vehicle.

Side plates 18 of the main frame of the air-conditioning apparatus for vehicle are arranged as both side surfaces of an indoor chamber and an outdoor chamber and each of the side plates 18 is extruded in one piece of aluminum, like the side plates in Embodiments 1 and 2. Each side plate 18 is molded so as to have a substantially C-shaped cross-section, and extends along the length of the railroad vehicle. The side plate 18 includes a molded-in attachment portion 18a which projects laterally outwardly from the side plate 18. The attachment portion 18a is molded so as to have substantially the same length as that of the side plate 18. The attachment portion 18a includes a support 18b on a surface (lower surface) thereof facing the roof 9 of the railroad vehicle, the support 18b having a curtain rail structure and being molded such that the support 18b and the attachment portion 18a have a substantially C-shaped cross-section. A gasket 10 for sealing to protect a compartment of the railroad vehicle against water from outdoors is attached to the support 18b. The gasket 10 has substantially the same length as that of the attachment portion 18a.

When the air-conditioning apparatus for vehicle according to Embodiment 3 is fitted in the roof 9 of the railroad vehicle, the air-conditioning apparatus for vehicle is attached through the gaskets 10 to the roof 9 of the railroad vehicle with the attachment portions 18a. Such an attachment manner allows a larger moment to be applied to the attachment portions 18a of the side plates 18. Accordingly, the side plates 18 have a larger thickness than the side plates 14 of the roof mounted air-conditioning apparatus for vehicle. Furthermore, the base of each attachment portion 18a protruding from the side plate 18 is rounded without sharp corners.

As described above, since each of the side plates 18 arranged as the side surfaces of the indoor chamber and the outdoor chamber is an extruded one-piece aluminum part, the number of parts and the number of processes can be reduced in the same way as Embodiments 1 and 2.

Since the base of each attachment portion 18a protruding from the side plate 18 is rounded without sharp corners, the strength can be enhanced without additional reinforcing members. Furthermore, since the support 18b, which has the curtain rail structure and is molded such that the support 18b and the attachment portion 18a have a substantially C-shaped cross-section, is provided on the lower surface of the attachment portion 18a, the gasket 10 for sealing can be easily attached.

Although the side plates 14 of the roof mounted air-conditioning apparatus for vehicle differ in shape from the side plates 18 of the fitted air-conditioning apparatus for vehicle, preparing two kinds of extrusion dies for aluminum enables provision of side plates for these air-conditioning apparatuses for vehicle. In the above description, the material for the side plates 14 and 18 is aluminum. Any metal capable of being extruded may be used.

REFERENCE SIGNS LIST

1, main frame;
2, compressor;
3, refrigerant gas-liquid separator;
4, indoor heat exchanger;
5, outdoor heat exchanger;
6, indoor fan;
7, outdoor fan;
8, attachment member;
9, railroad vehicle roof;
10, gasket;
11, end plate;
12, partition plate;
13, bottom plate;
14, side plate;
14a, 14b, support;
15, cover;
15a, side surface cover;
16, hanging fitting;
17, cover attachment fitting;

18, side plate;
18*a*, attachment portion; and
20, air outlet.

The invention claimed is:

1. An air-conditioning apparatus for a vehicle comprising:
   a casing divided into an indoor chamber and an outdoor chamber by a partition plate;
   a cover for placing on a top of the casing; and
   a refrigeration cycle device placed across the indoor chamber and the outdoor chamber in the casing,
   wherein a side plate constituting the casing is extruded in one piece of metal,
   wherein the side plate includes a plate-shaped attachment portion on an outer surface thereof such that the attachment portion extends in a longitudinal direction of the side plate and protrudes outwardly from the side plate,
   wherein the attachment portion includes a support on a lower surface thereof such that the support extends in a longitudinal direction of the attachment portion and protrudes downwardly from the attachment portion, the support having a curtain rail structure, and
   wherein the support is molded so as to have a downwardly opening, substantially C-shaped cross-section.

2. The air-conditioning apparatus for a vehicle of claim 1, wherein the metal is aluminum.

* * * * *